(12) United States Patent
Way et al.

(10) Patent No.: US 7,799,743 B2
(45) Date of Patent: Sep. 21, 2010

(54) LOST CIRCULATION ADDITIVE FOR DRILLING FLUIDS

(75) Inventors: Paul Way, Cambridgeshire (GB); Phillip Rice, West Midlands (GB); Gerald Meeten, Hertfordshire (GB); Louise Bailey, Cambridgeshire (GB)

(73) Assignee: M-I L.L.C., Houston, TX (US)

( * ) Notice: Subject to any disclaimer, the term of this patent is extended or adjusted under 35 U.S.C. 154(b) by 541 days.

(21) Appl. No.: 11/665,306

(22) PCT Filed: Oct. 13, 2005

(86) PCT No.: PCT/GB2005/003973

§ 371 (c)(1),
(2), (4) Date: Jun. 25, 2007

(87) PCT Pub. No.: WO2006/040578

PCT Pub. Date: Apr. 20, 2006

(65) Prior Publication Data

US 2008/0113879 A1    May 15, 2008

(30) Foreign Application Priority Data

Oct. 14, 2004    (GB) .................... 0422798.9

(51) Int. Cl.
*C09K 8/60* (2006.01)
*C09K 8/22* (2006.01)
*E21B 43/22* (2006.01)
*E21B 33/13* (2006.01)

(52) U.S. Cl. ............. 507/219; 507/117; 166/282; 166/292

(58) Field of Classification Search ........ 507/117, 507/219; 166/282, 283, 296
See application file for complete search history.

(56) References Cited

U.S. PATENT DOCUMENTS

| 4,579,668 | A  | * | 4/1986  | Messenger ............. 507/118 |
| 5,826,669 | A  |   | 10/1998 | Zaleski et al. |
| 6,902,002 | B1 |   | 6/2005  | Chatterji et al. |
| 7,284,611 | B2 | * | 10/2007 | Reddy et al. ............. 166/295 |
| 2004/0033905 | A1 | | 2/2004 | Shinbach et al. |
| 2004/0058825 | A1 | | 3/2004 | Rayborn |
| 2004/0244978 | A1 | | 12/2004 | Shaarpour |

FOREIGN PATENT DOCUMENTS

GB    2 246 804  A    2/1992

OTHER PUBLICATIONS

International Search Report for PCT/GB2005/003973 mailed Feb. 16, 2006 (2 pages).

* cited by examiner

*Primary Examiner*—Timothy J. Kugel
*Assistant Examiner*—Aiqun Li
(74) *Attorney, Agent, or Firm*—Osha • Liang LLP

(57) ABSTRACT

Additive for a drilling fluid to block drilling-induced or preexisting rock fractures comprising polymeric granules with a diameter distribution peak between 1000 and 200 microns and an average resiliency of at least 10% rebound after compression by a load of 200 N and uses thereof.

16 Claims, 3 Drawing Sheets

LOST CIRCULATION ADDITIVE FOR DRILLING FLUIDS

This invention pertains to an additive for reducing the effects of lost circulation of drilling fluid into the formation surrounding a wellbore during the drilling process.

BACKGROUND OF THE INVENTION

For the production of hydrocarbon wells, boreholes are drilled into subterranean formations. Following standard procedures, a fluid is circulated during drilling from the surface through the interior of the drill string and the annulus between drill string and formation. The drilling fluid, also referred to as "drilling mud", is used to accomplish a number of interrelated functions. These functions are:
(1) The fluid must suspend and transport solid particles to the surface for screening out and disposal;
(2) It must transport a clay or other substance capable of adhering to and coating the uncased borehole surface, both (a) to exclude unwanted fluids which may be encountered, such as brines, thereby preventing them from mixing with and degrading the rheological profile of the drilling mud, as well as (b) to prevent the loss of downhole pressure from fluid loss should the borehole traverse an interval of porous formation material;
(3) It must keep suspended an additive weighting agent (to increase specific gravity of the mud), typically barites (a barium sulfate ore, ground to a fine particular size), so that the entire column of drilling fluid is not interrupted upon encountering pressurized pockets of combustible gas, which otherwise would tend to reduce downhole pressure, as well as creating a "blowout" in which the fluid and even the drill stem are violently ejected from the well, with resulting catastrophic damages, particularly from fires;
(4) It must constantly lubricate the drill bit so as to promote drilling efficiency and retard bit wear.

The industry distinguishes between largely three classes of drilling fluids: oil-based, water-based and so-called synthetic muds. Oil-based and synthetics muds are recognized for their superior qualities for most of the drilling operations.

A drilling fluid typically contains a number of additives. Those additives impart desired properties to the fluid, such as viscosity or density. One class of additives is used as fluid loss agents to prevent the drilling fluid from entering into porous formations. While fluid loss agents are designed to form a competent filter cake to cover porous formations, there is another class of materials referred to as "lost circulation" agent. Lost circulation materials are designed to prevent or limit fluid losses into fractures or other openings in the formation.

The loss of drilling fluid into fractures is a major concern in the well construction process. There are a large number of products either employed, tested or proposed for reducing these losses. These products are typically particulates that invade the fracture and at some point along the fracture form a blocking bridge across the fracture. When the fracture is bridged a filter cake will develop due to the pressure difference between the wellbore fluid and the fluid beyond the fracture block. The pressure beyond the filtercake or bridge block is reduced and thus may prevent the full borehole pressure from affecting the tip of the fracture. However any further increase in the wellbore fluid pressure may result in further opening of the fracture leading to renewed losses. The additive described here is effective at blocking a fracture and provides resiliency that helps prevent re-opening of the fracture.

The US published patent application 2004/0033905 provides a drilling fluid composition comprising a drilling fluid vehicle, which may be oil- or water-based, and a composite microsphere component. The microspheres of the composite microsphere component may comprise any hollow microspheres of glass, ceramic or plastic that may be added to the drilling fluid (with other components of the drilling fluid known in the art) to reduce the density thereof.

The U.S. Pat. No. 4,579,668 describes a lost circulation agent which comprises a blend of two particulate materials. One or both of the materials may be derived by the processing of discarded wet-cell battery casings, which are stated to be principally made of polypropylene. The first particulate material employed is a thermoplastic polymer in a flexible, elongated laminar form having the desirable properties of both fibers and flakes. And the second of the particulate materials is a granular, thermoset plastic which has been ground into a granular form. This granular material may be derived from the processing of wet-cell batteries, as noted previously, in which the cases are formed of a hard rubber such as the phenol-formaldehyde resin available under the trade name Bakelite. As will be understood by those skilled in the art, that hard, synthetic rubbers such as Bakelite are thermoset resins which have a cross-linked polymeric network and remain relatively hard under high temperature conditions. The thermoset polymers may be contrasted with the thermoplastic polymers which are linear or branched chain polymers and which are softened by the application of heat. The thermoset resin preferably is ground in a distribution across a relatively wide particle size range to provide a maximum density bed particle size distribution as described in greater detail hereinafter. The particulate granular material has a specific gravity within the range of 1.2-1.4.

The use of graphitic materials for fluid loss and lubrication purposes is disclosed in the U.S. Pat. No. 5,826,669. A resilient graphitic carbon particle drilling fluid additive is used that is effective at preventing and controlling loss of drilling fluid into subterranean formations and has good lubrication properties. It showed that pores and fractures in shales, sandstones, and the like are effectively sealed with resilient graphitic carbon particles that can be tightly packed under compression in the pores and fractures to expand or contract without being dislodged or collapsing due to changes in the equivalent circulating density or with an increase in fluid weight. The patent does not recognize the importance of the re-opening pressure as a parameter to select and optimize lost circulation agents.

It is therefore an object of the present invention to provide novel agents for drilling fluids, particularly suitable for use as lost circulation agent.

SUMMARY OF THE INVENTION

In a first aspect, the invention includes an additive for a drilling fluid to block drilling-induced or pre-existing rock fractures comprising plastic granules with a diameter distribution peak between 1000 and 200 microns and an average resiliency of at least 10% rebound after compression by a load of 200 N. The diameter is taken as the largest distance across the particle. The resiliency is defined in accordance with a test procedure described hereinbelow. Preferably the load of 200 N is equivalent to a pressure of 0.4 MPa. Indeed, in a related aspect, the invention includes an additive for a drilling fluid to block drilling-induced or pre-existing rock fractures comprising plastic granules with a diameter distribution peak between 1000 and 200 microns and an average resiliency of at least 10% rebound after compression by a pressure of 0.4 MPa.

Preferably the plastic granules used are solid as hollow particles are likely to collapse under the pressure of a closing fracture. The granules are preferably made of polypropylene in a modification that fulfils the above-defined criteria.

The size distribution of the granules is preferably chosen such that at least 90% of the granules have a diameter between 1000 and 200 microns. In another preferred embodiment the resiliency of the agent is characterized by having at least 15% rebound after compression by a load of 200 N and/or a pressure of 0.4 MPa.

In order for the granules to display a progressive deformability that allows the granules to accommodate to opening or closing of fractures, it is preferred for the material of the granules to have a Young's modulus which is less than 10 GPa, and preferably less than 5 or 2 GPa. However, if the Young's modulus of the granules is too low, the load on the granules may be insufficient to retain the granules in a desired position in a fracture. For example, changes in the equivalent circulating density or in fluid weight may then cause the granules to migrate further into or out of a fracture. Thus preferably the material of the granules has a Young's modulus which is greater than 0.1 GPa, and preferably greater than 0.5, 0.7 or 1.5 GPa.

Further aspects of the present invention include a drilling fluid having additives as described above and methods of preventing or reducing the effects of lost circulation, with the step of adding to a drilling fluid such an additive and circulating the drilling fluid during the drilling of a well. The drilling fluid can be oil-based, water-based or synthetic.

Further additives as known in the art may be added to impart other desired properties to the drilling fluid system. Such known additives include viscosifying agents, filtrate reducing agents, and weight adjusting agents. Other preferred additives are shale-swelling inhibitors, such as salts, glycol-, silicate- or phosphate-based agents, or any combination thereof.

These and other features of the invention, preferred embodiments and variants thereof, possible applications and advantages will become appreciated and understood by those skilled in the art from the following detailed description and drawings.

For example, it will be appreciated by one of skill in the art that the disclosed subject matter includes methods for utilizing the disclosed fluids in the drilling and completion of a subterranean well. Thus illustrative embodiments of the claimed subject matter include: conducting drilling operations in a subterranean well that penetrates through one or more subterranean formations, the operations being carried out in the presence of a well bore fluid as substantially disclosed herein. Preferably the well bore fluid includes: a fluid continuous phase; and an additive comprising polymeric granules with a diameter distribution peak between 100 and 200 microns and an average resiliency of at least 10% rebound after compression by a load of 200 N and/or a pressure of 0.4 MPa. The granules are preferably made of polypropylene and utilized in the fluid at a concentration for the additive in the range of 5 ppb [14.4 g/l] to 30 ppb [87 g/l]. The fluid continuous phase is preferably selected from the group consisting of water-based drilling fluids, oil-based drilling fluids and synthetic-based drilling fluids.

Suitable water-based drilling fluids of the illustrative embodiments preferably utilize an aqueous fluid selected from fresh water, sea water, brine, water soluble organic compounds and mixtures thereof, as well as similar fluids known to one of skill in the art. Conventional additives for water based drilling fluids may also be added to the illustrative embodiments including viscosifying agents, rheology control agents, corrosion control agents and weighting agents, as well as combinations of these and similar compounds known to one of skill in the art. In most instances, a weighting material is desired to increase the density of the fluid. Such illustrative weighting agents may be soluble or insoluble in water. In one illustrative embodiment, the weighting agent is selected from the group consisting of barite, calcite, hematite, iron oxide, calcium carbonate, organic and inorganic salts, and mixtures thereof, as well as similar compounds known to one of skill in the art. When a viscosifying agent is utilized in the formulation of the illustrative fluid, it may be selected from natural and synthetic polymers, and organophilic clay and combinations thereof, as well as other viscosifying agents known to one of skill in the art of well bore fluids.

Suitable oil-based drilling fluids or synthetic-based drilling fluids of the illustrative embodiment preferably utilize any natural or synthetic oil. More preferably the fluid is selected from the group including diesel oil; mineral oil; a synthetic oil such as polyolefins, polydiorganosiloxanes, siloxanes or organosiloxanes; ester based oils; and mixtures thereof. When an invert emulsion based drilling fluid is made, the concentration of the oleaginous fluid should be sufficient so that an invert emulsion forms and may be less than about 99% by volume of the invert emulsion. In some embodiments the amount of oleaginous fluid is from about 30% to about 95% by volume and more preferably about 40% to about 90% by volume of the invert emulsion fluid. The fluids of the present invention may further contain additional components depending upon the end use of the fluid so long as they do not interfere with the functionality of the additives described herein. For example, rheology modifiers, alkali reserve, wetting agents, organophillic clays, viscosifiers, weighting agents, bridging agents and fluid loss control agents may be added to the fluid compositions of this invention for additional functional properties. The addition of such agents is known to one of skill in the art of formulating oil-based and synthetic-based drilling fluids and muds.

MODE(S) FOR CARRYING OUT THE INVENTION

In a drilling operation, usually a pipe is lowered from the surface carrying a drill bit. The drill bit is rotated and thus removes formation material ahead to extend the well. During most drilling operation, a drilling fluid is pumped through the pipe and the drill bit. It returns through the annulus of the drilled well. Among other properties, the drilling fluid in the annulus exerts a pressure on the surrounding formation to prevent both, the formation from collapsing into the well and sudden potentially hazardous influx of formation fluids. However the pressure exerted by the drilling fluid, when exceeding the strength of the surrounding formation, generates fractures. Other fractures or opening may be already present in the formation and crossed by the trajectory of the well. Through such fractures, a large amount of drilling fluid can be suddenly lost to the formation. To prevent the occurrence or mitigate the damages caused by lost circulation, so-called lost-circulation materials or agents are circulated in the well either as additives to the drilling fluid or as "pill" treatment.

Figure 1A:
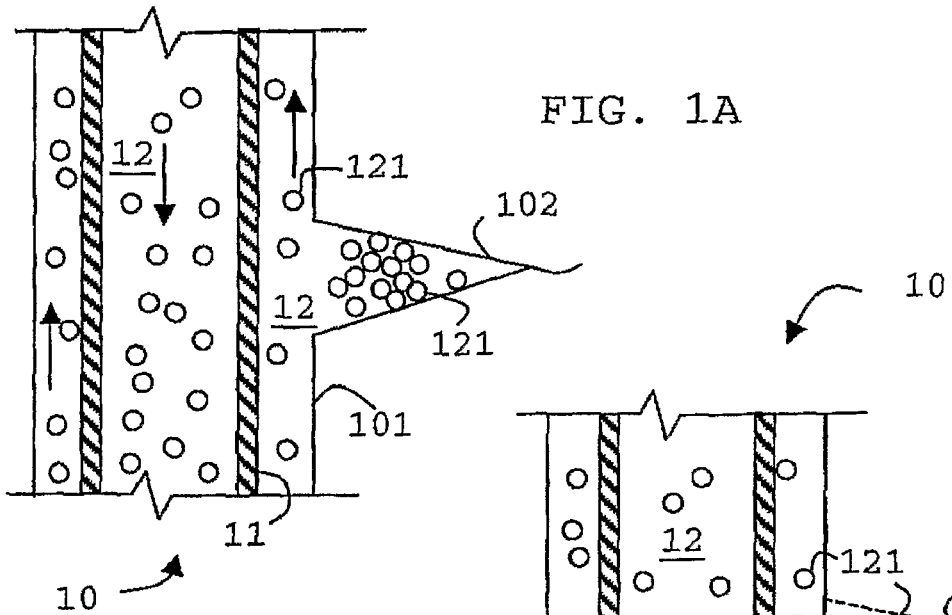
FIG. 1 illustrates a fracture during various stages of a drilling operation.

Referring now to FIG. 1A, there is shown a section of a drilled well 10. Also shown is a part of the drill string 11, and drilling fluid 12 circulating in the well. The mud includes lost circulation material. It is assumed that the pressure in the well exceeds the strength of the formation 101 and, consequently, a fracture 102 opens. As drilling fluid flows into the fracture 102, lost circulation material 121 accumulates until the fracture is bridged or plugged by a sufficient amount of the material. Once a plug is established, the pressure drops across it and the tip of the fracture is no longer subjected to the full well pressure. Hence, it can be assumed that the growth of the fracture stops.

Figure 1B:
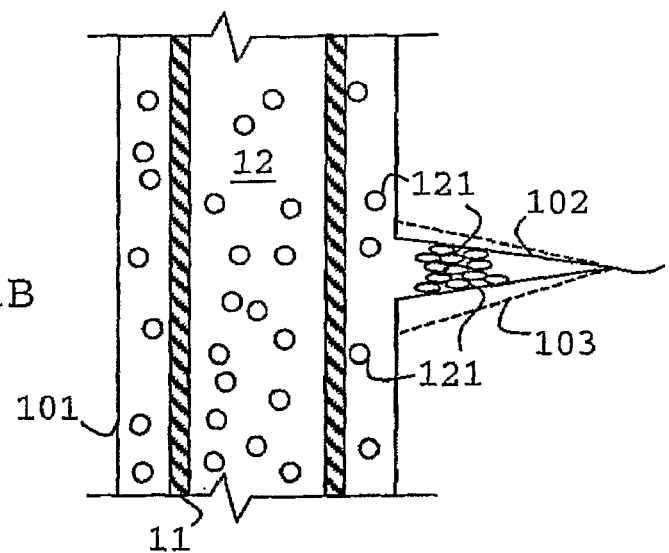

In FIG. 1B, which illustrates a subsequent stage, the well pressure is reduced and the fracture 102 closes though not fully. The dashed line 103 in FIG. 1B indicates the dimension of the original fracture. In the process of closure, the lost-circulation agents 121 in the fracture are compressed by the formation 101 and, depending on its properties, either reversibly or irreversibly compacted and deformed.

Figure 1C:
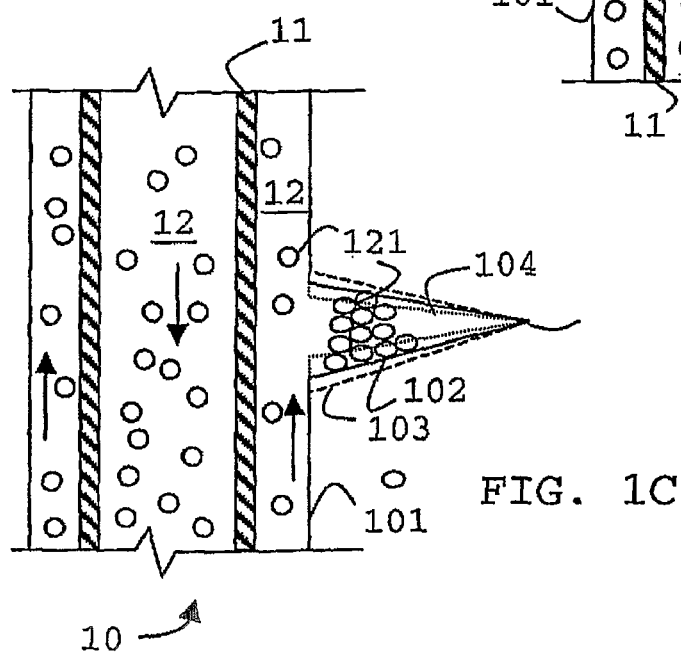

The FIG. 1C illustrates the re-opening of the fracture 102 as the pressure in the well is raised again. Under normal circumstances the re-opening pressure is lower that the initial fracturing pressure. As the fracture opens, the lost-circulation material 121 tend to loose contact with the formation wall inside the fracture 102 and the well fluid pressure may force a further opening the fracture. Or it may be that the re-opening of the fracture destabilizes the bridge or plug of material 121 established in the prior step. Both types of failures can lead to an increased pressure at the tip of the fracture. According to this invention, it is seen as an important feature of a lost-circulation agent to raise the threshold pressure for the re-opening of the fracture. As illustrated in FIG. 1C, it is the resilience of the agent 121 which prevents a failure of the established bridge or plug and thus raises the re-opening pressure. As the fracture 102 opens, the resilient particles 121 at least partly regain their shape and remain in contact with the formation 101. As above the shape of the earlier stages of the fracture are indicated by a dashed line 103 denoting the original opening and a dotted line 104 indicating the shape of the fracture at the reduced well pressure (FIG. 1B). During a period in which the particles retain a sealing effect, the fracture tip is exposed to a pressure which is reduced compared to the well pressure. Hence, the fracture opens only at an increased well pressure compared to other loss circulation materials.

Test fluids and novel fluid additives were tested in a high pressure rig built that measures the pressure required to initiate a fracture in a rock core, allow the fracture to close, and then to measure the pressure required to re-open it.

The high pressure fracture initiation cell is based around an 11000 PSI pressure vessel, with overburden pressure provided by an Enerpac hydraulic jack and confining pressure by an air driven oil pump. The test fluid is pumped into the core and pressurized with a syringe pump.

The rock samples are cylindrical with a diameter of 150 mm and a length of 200 mm. A hole is pre-drilled centrally (25 mm diameter hole, 150 mm deep) in the top of the rock core to allow for fluid access.

The experimental procedure for testing was as follows—

Cell assembly.

Apply an overburden pressure of 3000 PSI and a confining pressure of 150 PSI.

With the syringe pump increase the mud pressure in defined steps, may be as large as 250 PSI initially but can be reduced to 10 PSI to improve accuracy as the fracture point is neared.

The knowledge of the potential fracture point is derived from repeated testing. The fluid pressure is increased until a fracture is generated.

When the rock fractures approximately 25 ml of fluid is pumped through the fracture. The pump is then stopped and the mud pressure decays away until fracture closes.

After a defined period of time the syringe pump is then reset to a value just above the residual mud pressure and restarted.

Mud pressure is then increased again in 250 PSI steps or finer steps to find a re-opening pressure for the fracture. The higher the fracture re-opening pressure when compared against the initial gives an indicator of the material efficiency.

Figure 2:
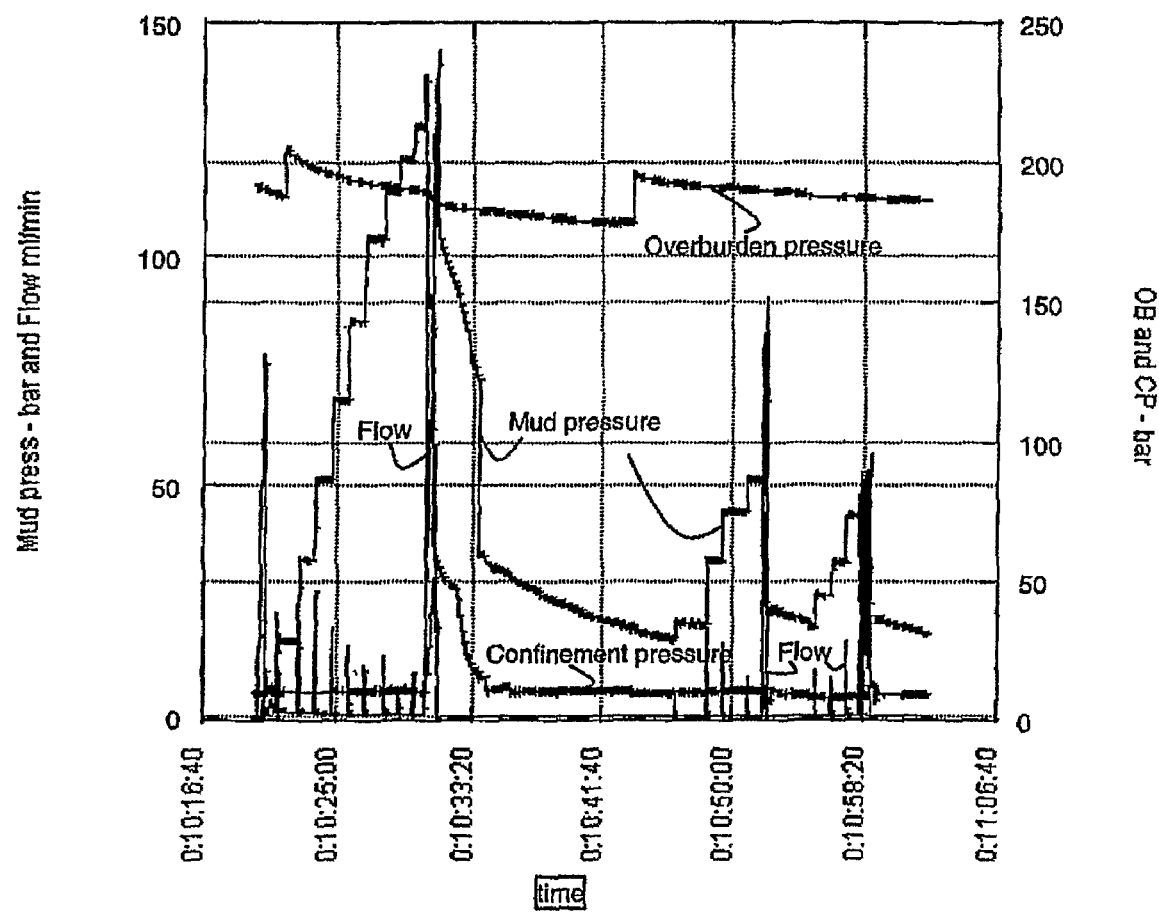
FIG. 2 is a graph illustrating measurements to establish the performance of lost circulation agents.

A typical data set is shown in FIG. 2. In the test shown an overburden pressure is applied and kept constant through the test—about 3000 PSI. The confining pressure is set around 150 PSI. Mud pressure is then applied and increased in 250 PSI increments. As the mud pressure is increased the syringe pump flow rate can be seen to be high for a short period until the set pressure is reached. When the set mud pressure is reached the pump flow rate drops back to a fraction of a ml/min, this flow is to maintain the mud pressure loss from fluid filtration. When the rock fractures the pump flow rate increases rapidly to its maximum and there is a corresponding jump in the confining pressure as it is now connected to the mud pressure.

Approximately 25 ml of mud is allowed to flow through the fracture before stopping the pump. The fracture closes when the mud is no longer being pumped through and the mud pressure drops away. Confining pressure is then drained back to 150 PSI and the fracture left shut for a defined period of time—in this case about 15 minutes. The process is then repeated with the mud pressure being increased until the fracture re-opens, evidenced again by the high pump flow rate. A second re-opening cycle is also shown in the above data. The initial fracture re-opening pressure is about half the original fracture pressure and this drops further on the second re-opening cycle.

The data in Table 1 details results comparing a standard oil base fluid (OBM) weighted to 9.5 pounds per gallon with barite and the same fluid with the addition of graphitic and polypropylene particulates, respectively, as lost-circulation material. The data for the oil based mud (OBM) without any of the lost-circulation additives shows a re-opening pressure at around 50% of the initial fracture pressure. The addition of the two graphitic materials (source M-I L.L.C) at 20 pounds per barrel (ppb) [57 g/l] shows an improvement in the re-opening pressure to a level of about 65% of the initial. A further improvement is measured with polypropylene granules at the 10ppb [28.6 g/l] level and a re-opening pressure of 73% of the initial is recorded and at 20 ppb a re-opening pressure of 76% of the initial. The polypropylene granules are all less than 1000 microns, 95% smaller than 800 microns and have no more than 15% smaller than 200 microns in size.

TABLE 1

Influence of graphitic and polypropylene particles on fracture re-opening pressures

| Fluid | Fracture re-opening pressure as % of initial fracture pressure |
|---|---|
| Base oil based mud (OBM) | 55% and repeat 48% |
| Base OBM + 20 ppb Graphite A | 65% |
| Base OBM + 20 ppb Graded<500 micron Graphite B | 66% and repeat 68% |
| Base OBM + 10 ppb Polypropylene granules | 73% and repeat 74% |
| Base OBM + 20 ppb Polypropylene granules | 76% |

Hence, the polypropylene granules show an improvement over known additives in the same order of magnitude as the known graphite additives over oil based mud without any lost-circulation additives. Similar effects can be observed for synthetic mud of water-based mud. This beneficial effect may be also found in granules made of similar plastics material, such as polyethylene particles and the like.

It may be advantageous to blend the granular lost circulation material of the invention with other known lost circulation materials. Such materials are for example described in the above-cited U.S. Pat. No. 4,579,668, which in addition suggests that superior results can be achieved by mixing fibrous material with granular material for an optimized effect.

Whilst many different properties interact to give a material with superior qualities, resilience is seen as being one of the more important factors. Material resiliency can be described as an ability of a material to recover shape and size elastically.

This characteristic of the lost-circulation material is considered important in the fracture re-opening process where with an increase in well bore pressure the fracture may start to widen again. In such a scenario, the ability of the compressed granular particles in the fracture to regain shape with the widening fracture prevents transmission of fluid pressure to the fracture tip so preventing further propagation of the fracture.

To consider material resiliency a simple test is used. A cylindrical sample container into which a piston rod fits is mounted onto a load frame. The cylindrical container has a circular cross-section with an internal diameter of 25.4 mm (1 inch). To run a test a depth of approximately 25 mm of sample is placed in the container and the piston placed on top. The piston is a good fit in the container but it does not form an airtight seal—hence air may escape the apparatus as the sample is compressed. To apply a load to the sample the frame is moved down at a constant rate and the piston compresses the test material until a pre-defined load is reached, the load frame is then moved back up at the same rate to remove the loading from the sample. The load frame was moved down at a constant rate of 0.5 mm/minute to compress the sample until a loading of 200 N (20 kg) was reached, the frame was then moved up again at 0.5 mm/min until the load was removed. The maximum loading pressure (i.e. the maximum load divided by the cross-sectional area of the piston rod) is therefore 0.4 MPa. Of course individual particles in the sample may experience higher or lower pressures than this, but as long as the dimensions of the sample are orders of magnitude larger than the dimensions of the particles which make up the sample, load variation from particle to particle averages out in the sample, leading to reproducible test results.

Figure 3:
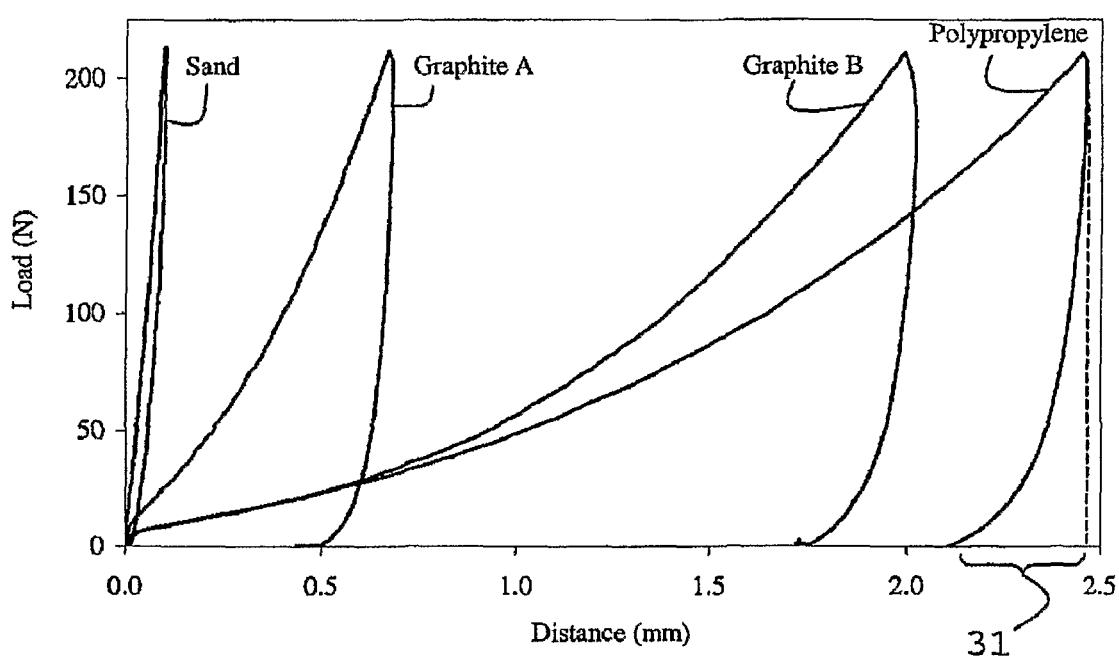
FIG. 3 compares the resilience of several materials.

Resiliency measurement data collected for sand grains, graphite A, graphite B and polypropylene granules is shown in FIG. 3. If we consider the graphites and polypropylene materials we see that as the load is applied the material compresses until the loading of 200 N (pressure of 0.4 MPa) is reached, the load is then removed and the force drops away giving a crescent shaped curve. The return curve shape characterises the resiliency of the material, because as the load is removed the force generated from the material 'springing back' maintains pressure on the piston. The resiliency is calculated as a 'rebound' taken as the distance between the peak load and the point where the load returns to zero, indicated as distance 31 in FIG. 3. for the polypropylene material, divided by the total distance of the loading curve. The data shows the resiliency of the polypropylene granules to be greater than graphite B which in turn is greater than graphite A. The polypropylene granules as proposed for the use as lost-circulation agents rebound by 10% to 20% of the size under a load of 200N (pressure of 0.4 MPa). Graphite B, whilst in the same order, exhibits on average a lower resilience.

At least for the graphite and polypropylene test samples, settling of the particles in the test samples did not contribute significantly to the loading and unloading curves, i.e. the curves are essentially determined by the sum of individual particle deformations, not relative movements between particles leading to gross sample compaction.

A material expected to show little resiliency, such as sand, has an unloading line which drops almost vertically with no indication of curvature. This indicates there is no resiliency in the sand to maintain force on the piston as the load is removed and a very small upward movement completely removes the loading. Indeed, some of the apparent deformation of the sand sample during loading may be due to compaction of the sample, i.e. relative movements between sand particles. However, sand is a hard material with a relatively high Young's modulus. Therefore, because the testing was performed under displacement control, the load was applied and removed very rapidly. This makes it is difficult to accurately interpret the test results for sand. In practice, sand's hardness and high Young's modulus would make it difficult for sand to provide the same degree of accommodation to fracture opening or closing that plastic granules can provide.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An additive for a drilling fluid to block drilling-induced or pre-existing rock fractures comprising polymeric granules with a diameter distribution peak between 1000 and 200 microns and an average resiliency of at least 10% rebound after compression by a load of 200 N, wherein at least 90% of the granules have a diameter between 1000 and 200 microns.

2. The additive of claim 1 wherein the granules are solid.

3. The additive of claim 1 wherein the granules are homogenous.

4. The additive of claim 1 wherein the granules are polypropylene granules.

5. The additive of claim 1 having an average resiliency of at least 15% rebound after compression by a load of 200 N.

6. A drilling fluid comprising an additive in accordance with claim 1.

7. The drilling fluid of claim 6 wherein the concentration of the additive is in the range of 5 ppb to 30 ppb.

8. The drilling fluid of claim 6 wherein the additive is mixed with further lost-circulation materials.

9. The drilling fluid of claim 8 wherein the additive is forming part of a mixture comprising fibrous and granular particles.

10. A method of preventing or reducing the effects of lost circulation, comprising the step of adding to a drilling fluid an additive in accordance with claim 1; and circulating said drilling fluid during the drilling of a well.

11. A method of preventing or reducing the effects of lost circulation, comprising the step of monitoring drilling fluid losses during the drilling of a well; and injecting a concentrated mixture of an additive in accordance with claim 1 into the well if the fluid losses exceed an acceptable level.

12. A method comprising: conducting drilling operations in a subterranean well that penetrates through one or more subterranean formations, wherein the conducting is carried out in the presence of a well bore fluid, the well bore fluid including: a fluid continuous phase; and an additive comprising polymeric granules with a diameter distribution peak between 1000 and 200 microns and an average resiliency of at least 10% rebound after compression by a load of 200 N, wherein at least 90% of the granules have a diameter between 1000 and 200 microns.

13. The method of claim 12, wherein the granules are polypropylene granules.

14. The method of claim 12, wherein the fluid continuous phase is selected from the group consisting of a water-based drilling fluid, an oil-based drilling fluid and a synthetic-based drilling fluid.

15. The method of claim 12, wherein the well bore fluid further comprises lost-circulation materials.

16. The method of claim 12, wherein the concentration of the additive is in the range of 5 ppb to 30 ppb.

* * * * *

UNITED STATES PATENT AND TRADEMARK OFFICE
CERTIFICATE OF CORRECTION

PATENT NO. : 7,799,743 B2  Page 1 of 1
APPLICATION NO. : 11/665306
DATED : September 21, 2010
INVENTOR(S) : Paul Way et al.

It is certified that error appears in the above-identified patent and that said Letters Patent is hereby corrected as shown below:

In Claim 7, Column 9, line 2, the words "5 ppb to 30 ppb" should read --5 ppb [14.4 g/1] to 30 ppb [87 g/1]-- and, In Claim 16, Column 10, line 17, the words "5 ppb to 30 ppb" should read --5 ppb [14.4 g/1] to 30 ppb [87 g/1]--.

Signed and Sealed this

Thirtieth Day of November, 2010

David J. Kappos
*Director of the United States Patent and Trademark Office*